(No Model.) 2 Sheets—Sheet 2.
L. PATTBERG.
COMBINED STEREOSCOPE AND GRAPHOSCOPE.
No. 243,964. Patented July 5, 1881.
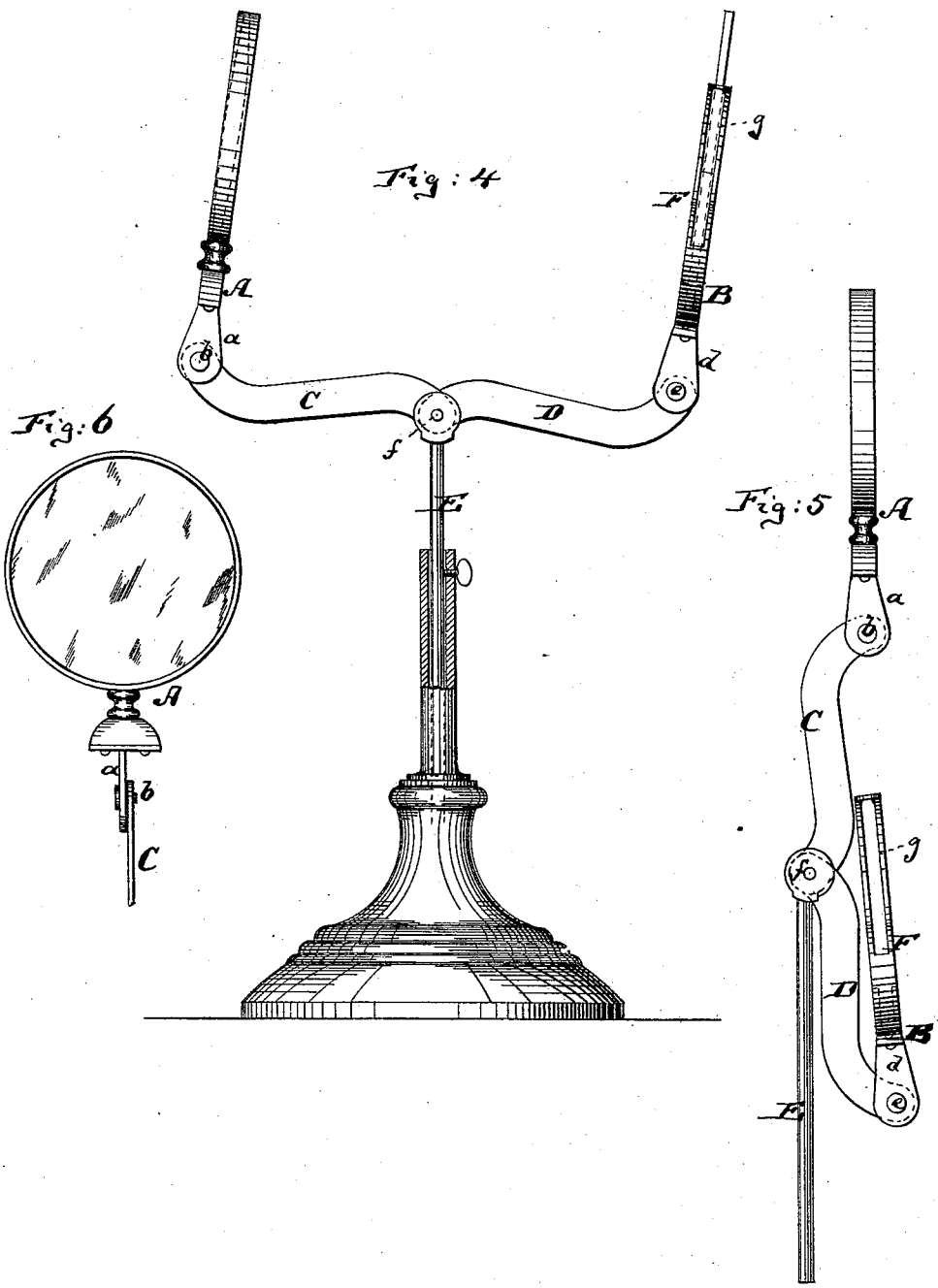
Witnesses
John C. Tunbridge
Henry F. Parker
Inventor:
Lewis Pattberg
by his attorney
A. V. Brieser

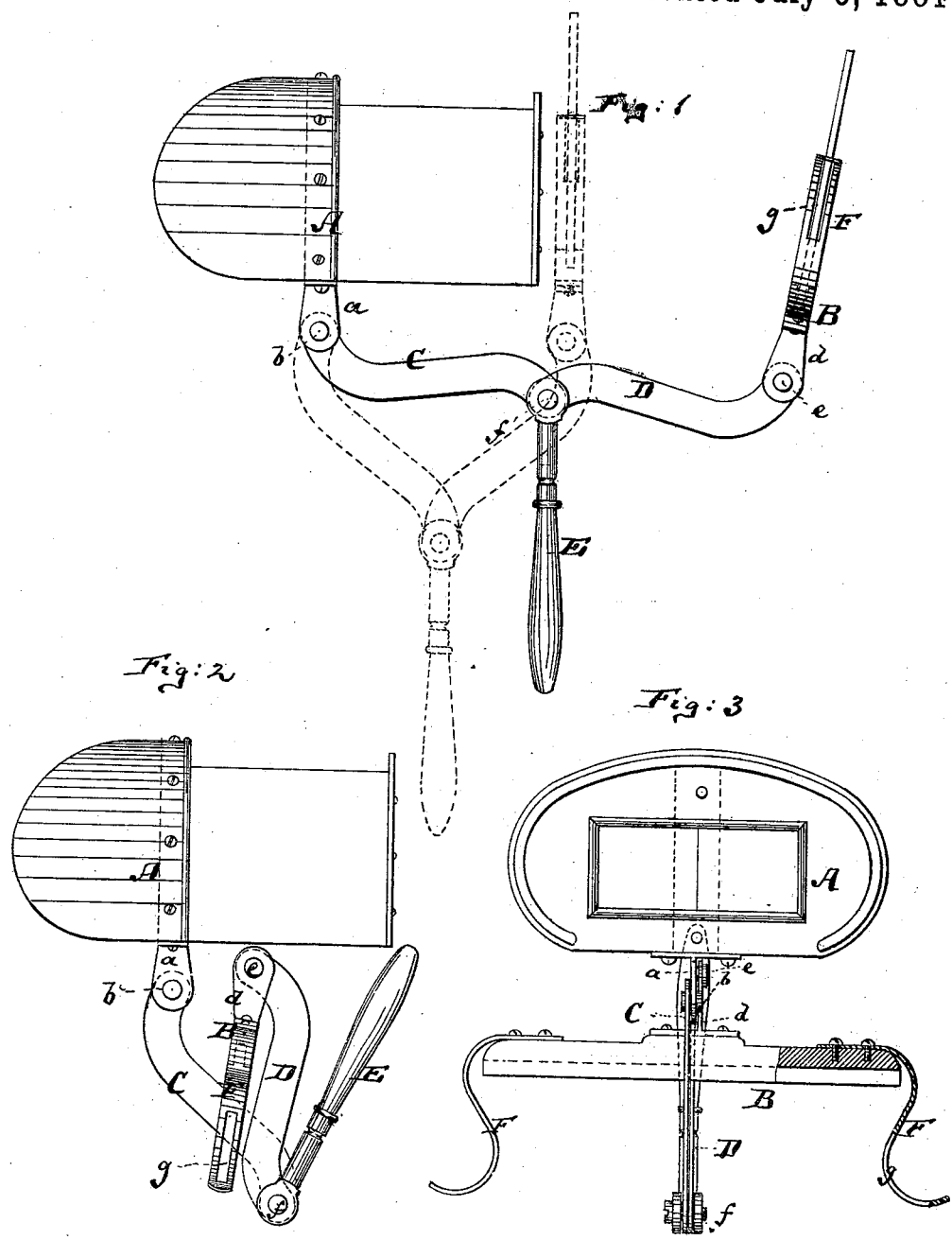

UNITED STATES PATENT OFFICE.

LEWIS PATTBERG, OF JERSEY CITY, NEW JERSEY.

COMBINED STEREOSCOPE AND GRAPHOSCOPE.

SPECIFICATION forming part of Letters Patent No. 243,964, dated July 5, 1881.

Application filed April 18, 1881. (No model.)

*To all whom it may concern:*

Be it known that I, LEWIS PATTBERG, of Jersey City, in the county of Hudson and State of New Jersey, have invented an Improvement in Stereoscopes, Graphoscopes, &c., of which the following is a specification.

Figure 1 is a side view of a stereoscope containing my invention, showing it expanded for use. Fig. 2 is a side view of the same, showing it folded together. Fig. 3 is a front view, partly in section, of the same when in the position indicated in Fig. 2. Fig. 4 is a side elevation of a graphoscope constructed according to my invention. Fig. 5 is a side view of the same when folded together. Fig. 6 is a face view of the upper portion of said graphoscope.

This invention relates to a new construction of a stereoscope or graphoscope frame. As these frames were heretofore constructed they were supplied with sliding picture-carriers that could be placed at a greater or less distance from the lenses; but such slides did not permit the angle of the picture to the lens to be varied, nor did they permit the folding of the picture-carrier out of the line of the lens, so that, for example, a graphoscope-lens had to be actually detached from the picture-holder, if it was to be used for purposes of ordinary observation—that is to say, of examination of things that could not be placed into the picture-holder.

Stereoscopic and other pictures which are taken by the photographic process are not always taken by holding the negative strictly parallel with the object which is being photographed. In most cases the camera is inclined toward the object, either upward in taking a picture of a landscape, of mountain scenery, buildings, or the like, or downward in taking photographs of persons, flowers, animals, &c. It is clear that a picture which is taken through an inclined camera is best observed through a lens which is inclined toward the picture in the same ratio in which the camera was originally inclined toward the object that was being photographed. Therefore it is a serious defect in ordinary stereoscopes and graphoscopes that the angle of the picture to the lens cannot be varied.

My invention consists, principally, in connecting the picture-holder with the lens-holder of a stereoscope or graphoscope by means of jointed levers the joints of which are friction-joints, that will retain the members of the connecting-pieces in the position which may be assigned to them from time to time, allowing them, nevertheless, to be moved on the joints into other positions, which then they will readily retain. By this arrangement I am enabled to vary at pleasure the distance between the lens and the picture, and also the angle of the lens to the picture; and am furthermore enabled by the same arrangement to fold the instrument into compact form, and also to use the graphoscope for the purpose of observing articles that cannot be placed on the picture-holder without detaching the picture-holder from the lens-holder of the graphoscope.

In the accompanying drawings, the letter A represents the lens-holder. B is the picture-holder. C and D are the connecting rods or links for joining the lens-holder A to the picture-holder B. The lens-holder A has a downwardly-projecting lug, $a$, to which the front end of the link C is joined by a friction-joint, $b$. The picture-holder B has a downwardly-projecting lug, $d$, to which the rear end of the link D is joined by a friction-joint, $e$. The two links C and D are joined together by friction-joint $f$.

A suitable handle, E, may be connected with the friction-joint $f$, or with any other part of the apparatus for holding the instrument in the hand, or for supporting it on a stand, as in Fig. 4.

On the joints $b$, $f$, and $e$ the parts can be moved so as to bring the picture-holder nearer to or farther away from the lens, and also to hold the picture at any desired angle to the lens. The links C and D, being made as indicated in the drawings, will answer the purpose admirably; but it is very clear that by increasing their number substantially the same result will be attained, and I do not limit myself to their number.

In Fig. 1 the full lines show the picture at a greater distance, and the dotted lines show it at a less distance, from the lens, the two positions of the picture being also at different inclinations.

Instead of having the lugs a d project downwardly, as shown, they may project backward or forward or slightly upward, if desired, or may be entirely dispensed with, as the links C and D may be pivoted by suitable friction-joints directly in the lens and picture-holders.

The picture-holder is a cross-bar, as shown in Fig. 3, (in which figure it is shown in the inverted position to indicate how the instrument can be folded together for transportation or packing,) and has at its ends projecting springs F F, each formed like the letter S, each spring having a slot at its inner convex portion, said slot being indicated by the letter $g$ in Figs. 2, 4, and 5. These two springs F F, having the said slots, will hold the picture in place, and will permit a longer or shorter picture to be properly held. The edges of the picture will enter the slots $g$ in the springs, and the picture will thereby be prevented from swinging forward or backward. At the same time the edge of the picture will bear against the body of the spring below and above the slot $g$, or either, and thereby be held in proper position longitudinally; but any other kind of picture-holder may be used.

I claim—

1. The combination of the lens-holder A and picture-holder B with two or more jointed connecting-rods, C D, all arranged to permit the distance between the picture and the lens and their relative inclination to be varied, substantially as herein shown and described.

2. The combination of the lens-holder A with the picture-holder B, rods C and D, connecting friction-joints, and with the handle E, substantially as herein shown and described.

LEWIS PATTBERG.

Witnesses:
WILLY G. E. SCHULTZ,
JULIUS HILSEN, Jr.